United States Patent
Neubeck

(10) Patent No.: US 9,426,427 B2
(45) Date of Patent: Aug. 23, 2016

(54) STORAGE SYSTEM WITH STATIC ASSIGNMENT OF STORAGE MEDIA AND METHOD FOR SETTING UP THE STORAGE SYSTEM

(71) Applicant: Robert Bosch GmbH

(72) Inventor: Alexander Neubeck, Obermichelbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/366,359

(22) PCT Filed: Dec. 5, 2012

(86) PCT No.: PCT/EP2012/074497
§ 371 (c)(1),
(2) Date: Jun. 18, 2014

(87) PCT Pub. No.: WO2013/092213
PCT Pub. Date: Jun. 27, 2013

(65) Prior Publication Data
US 2014/0363135 A1 Dec. 11, 2014

(30) Foreign Application Priority Data
Dec. 19, 2011 (DE) .......................... 10 2011 089 043

(51) Int. Cl.
*H04N 5/77* (2006.01)
*H04N 5/907* (2006.01)
(Continued)

(52) U.S. Cl.
CPC .......... *H04N 7/181* (2013.01); *G08B 13/19656* (2013.01); *G08B 13/19665* (2013.01); *G11B 31/006* (2013.01); *H04N 5/76* (2013.01); *H04N 5/765* (2013.01)

(58) Field of Classification Search
CPC ......... H04N 5/76; H04N 5/765; H04N 7/181; G08B 13/19656; G08B 13/19665; G08B 31/006
USPC .................................................. 386/223, 227
See application file for complete search history.

(56) References Cited

U.S. PATENT DOCUMENTS

| 5,282,092 A | 1/1994 | Wilhelms |
| 2003/0117500 A1 | 6/2003 | Lin |
| 2006/0204207 A1 | 9/2006 | Gilge |

(Continued)

FOREIGN PATENT DOCUMENTS

| CN | 2834062 | 11/2006 |
| DE | 102006018959 | 10/2007 |
| TW | 201003579 | 1/2010 |

OTHER PUBLICATIONS

International Search Report for Application No. PCT/EP2012/074497 dated Mar. 7, 2014 (English Translation, 3 pages).

*Primary Examiner* — Geepy Pe
*Assistant Examiner* — Syed Hasan
(74) *Attorney, Agent, or Firm* — Michael Best & Friedrich LLP

(57) ABSTRACT

The invention proposes a storage system having a number of M storage media, having a number of N data producers each providing a data stream and each having one or more data members, and having a storage management device for distributing the data streams from the N data producers to the M storage media, wherein a group of (A+1) of the M storage media is statically assigned to each of the N data producers, where 1<A<M.

13 Claims, 4 Drawing Sheets

(51) Int. Cl.
*H04N 7/18* (2006.01)
*G08B 13/196* (2006.01)
*G11B 31/00* (2006.01)
*H04N 5/765* (2006.01)
*H04N 5/76* (2006.01)

(56) References Cited

U.S. PATENT DOCUMENTS

2006/0204229 A1\* 9/2006 Onodera ................ H04N 5/247
386/223

\* cited by examiner

STORAGE SYSTEM WITH STATIC ASSIGNMENT OF STORAGE MEDIA AND METHOD FOR SETTING UP THE STORAGE SYSTEM

BACKGROUND OF THE INVENTION

The invention relates to a storage system having a number of M storage media, having a number of N data producers each providing a data stream and each having one or more data members, and having a storage management device for distributing the data streams from the N data producers to the M storage media. The invention also relates to a method for setting up the storage system.

Storage systems of a conventional architecture may have a plurality of data-producing devices and a plurality of storage media which are arranged in a network and store the data from the data-producing units. The storage media are distributed to the data-producing units using a storage manager which is also responsible for the so-called load balancing which is intended to ensure that the storage media are optimally used and the recording onto other storage media can be continued if individual storage media fail. In this case, the storage manager may, in principle, freely access all storage media in a network.

In the field of surveillance systems with surveillance cameras in particular, the organization of the storage of the data produced is a challenge since, on the one hand, the surveillance cameras produce large quantities of data and, on the other hand, it is particularly desirable for the user for these data to be stored without interruption and, in particular, without failure.

In this context, the document DE10301455A1 which probably forms the closest prior art discloses a method for recording video/audio data. In the method, it is proposed that a local data store is connected, via data coupling, to at least one recording apparatus which has a greater storage capacity than the local data store, thus forming a virtual data store for the recording apparatus. The recording apparatus may have a multiplicity of storage media. The method is fundamentally also referred to as the NVR (Network Video Recording) principle.

SUMMARY OF THE INVENTION

Advantageous embodiments of the invention emerge from the claims, the following description and the accompanying figures.

The storage system according to one embodiment of the invention is suitable and/or designed for storing digital data. It comprises a number of M storage media which may, in principle, be formed by volatile and/or non-volatile memories. In order to avoid data loss in the event of a power failure, however, it is preferred for at least the majority of, preferably all M, storage media to be in the form of non-volatile memories. In particular, the storage media are in the form of physical storage media, for example hard disks.

The storage system also comprises a number of N data producers each providing a data stream at a transmission rate. A data stream is a temporal sequence of data, for example image data in an image data stream. The data stream has digital data, in particular. Each of the N data producers may have one or more data members. A data producer may therefore be a single data member or a group of data members combined to form a data producer. The data members generate the data stream from a data producer.

The storage system comprises a storage management device which is designed to distribute the data streams from the N data producers to the M storage media. This is achieved, in particular, by virtue of the storage management device assigning the N data producers to the M storage media, with the result that the data streams from the data producers are passed to the storage media assigned to the latter.

The invention proposes that a group of (A+1) of the M storage media is statically assigned to each of the N data producers, in which case the inequality $1 \leq A < M$ applies. The same value for A particularly preferably applies to each of the N data producers, with the result that the same number of M storage media is statically assigned to each of the N data producers.

The invention is based on the consideration that the existing storage systems which can freely access all storage media when allocating memory operate perfectly as long as all storage media are available and there are no bandwidth or session limitations. If there are such limitations, such distribution strategies are no longer optimal.

In contrast, the invention proposes using a static storage system which can therefore be controlled in a simple manner. Static means, in particular, that not every data producer can record onto every storage medium, but rather that the data producer can have limited, in particular exclusive, access to a restricted number of storage media, for example two storage media, depending on the required failure safety of the storage system. As a result of the static allocation, system-related limitations for a worst-case scenario can be checked and can therefore be guaranteed for the runtime of the system. In particular, the predictability of the storage system in worst-case scenarios is increased.

In one particularly preferred embodiment of the invention, the storage system is in the form of a surveillance system and/or at least one data member or a data producer is in the form of a surveillance camera. In particular, the data member(s) is/are connected to the storage media via a network. As already explained at the outset, it is decisive, particularly in the case of surveillance systems as are used, for example, to monitor public buildings, spaces, companies or production sites etc., that firstly data streams containing data which are coherent in terms of content are generated and that secondly it is necessary to store these data without losses. In particular, the intention is to ensure that the data can be combined again at a later time to form a video scene. In conventional systems which can freely select the storage medium, there is always the fear that the allocation strategy results in completely fragmented recordings. This allocation strategy is at particular risk after adding or removing storage media.

In contrast, static allocation ensures that associated data from a data member or data producer, in particular a surveillance camera, are stored in a comprehensible manner on an accurately defined, namely statically stipulated, number of storage media.

The advantages of the invention become particularly apparent if the number N of data producers is selected to be greater than 6, preferably greater than 10 and, in particular, greater than 32. The value A should simultaneously be selected to be $\leq 6$, preferably $\leq 4$ and, in particular, $\leq 2$ or $<2$. The data streams are highly defragmented when the data streams from the data producers are freely distributed to all available storage media. In contrast, the storage system according to the invention ensures that each data producer writes to a very clear and/or known quantity of data media.

In order to make the storage system reliable with respect to failures of a number of A storage media, one consideration of the invention is to provide each data producer with at least A+1 storage media for recording, that is to say to assign at least A+1 storage media to each data producer. For reasons of cost, it is preferred to select A to be small, in particular to be as small as possible. Therefore, one possible constellation of the invention provides for N data producers to be distributed to M storage media, in which case each data producer receives two storage media, with the result that A=1 is selected. Therefore, there may be at most 2 of M, that is to say $\binom{M}{2}$, different groups of storage media. With a preferred distribution, there is exactly one data producer per group.

One preferred development of the invention provides for each of the N data producers to have a data stream at a data transmission rate, the data members of the data producers being selected in such a manner that the data transmission rates of the data streams from the N data producers are approximate or equal to one another or to a common system transmission rate. The storage management device selects the data members and sorts them into the data producers. The storage management device sorts the data members into groups such that the groups are similar in terms of the data transmission rate.

It is also possible to define a common system transmission rate and to sort the data members into the data producers in such a manner that the data transmission rates of the data streams from the data producers are the same as or at least similar to the system transmission rate. The common system transmission rate can optionally be predefined or estimated by the user.

In one specified embodiment of the invention, the common system transmission rate is stipulated, in which case the storage management device ensures that the data members are sorted in such a manner that the data transmission rates of the data streams from the data producers are less than twice, preferably less than 1.5 times and, in particular, less than 1.3 times and simultaneously greater than 0.5 times, preferably greater than 0.7 times and, in particular, greater than 0.8 times the common system transmission rate.

If the preferred embodiment in which A=1 is selected is considered, the storage system can automatically compensate for the above-mentioned deviations from the system transmission rate without reconfiguration, with the result that the average load on all storage media remains constant and the life times of the data for all data producers strive for the same value.

In one preferred development of the invention, each of the M storage media has a counter which provides a counter reading. The counter reading is increased on the basis of a quotient between the allocated memory and the available storage capacity of the storage medium. If the storage medium has 100 units as the storage capacity, for example, and if 10 units are allocated as memory, the counter is increased by 10/100, that is to say by 0.1.

The storage management device is designed to pass a data stream from a data producer to the storage medium in the group of assigned storage media which has the lowest counter reading. The storage media operate according to a FIFO principle, in which case the memory with the oldest entries is overwritten as soon as the storage medium is full.

This distribution system has the advantage that data from a data producer are uniformly distributed to the storage media assigned to the data producer and, in particular, no clustering is produced in the storage media.

If the counter readings of a group of A+1 storage media assigned to a common data producer differ too greatly, it is proposed, as a possible countermeasure, to set all counter readings to 0 or to match them to a common counter reading.

This refinement is also based on the consideration of largely avoiding clustering when storing the data from a data producer. If, in a group of A+1 storage media assigned to a single data producer, there is a storage medium having a counter reading which is very low in comparison with the other storage media, the storage management device will direct the data stream to the storage medium having this low counter reading. However, this again results in clustering on this storage medium. For this reason, it is proposed to match the counter readings to one another again, for example when inserting a new storage medium into the storage system (which therefore has a counter reading of 0) or when the counter readings drift apart.

The invention also relates to a method for operating the storage system as described above or as claimed in one of the preceding claims. In the method, the data members are first of all distributed to the data producers in such a manner that each data producer has a similar data transmission rate or a system transmission data rate. A group of (A+1) of the M storage media is then statically allocated to the N data producers.

BRIEF DESCRIPTION OF THE DRAWINGS

Further features of the invention emerge from the following descriptions of preferred exemplary embodiments of the invention and from the accompanying figures, in which.

DETAILED DESCRIPTION

Figure 1:
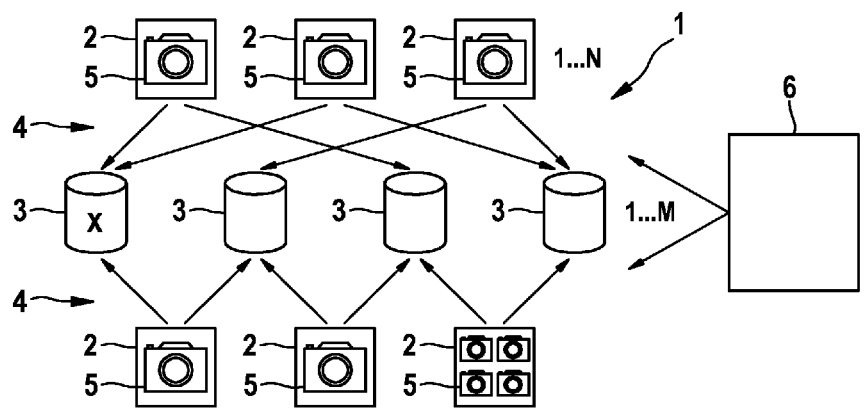
FIGS. 1 to 6 show a schematic block diagram of the storage system.

FIG. 1 shows a storage system 1 having a plurality of N data producers 2 and a plurality M of storage media 3. The data producers 2 are connected to the storage media 3 using data technology, for example via a network 4. The storage system 1 is a storage system 1 for a surveillance system having a plurality of data members, for example surveillance cameras 5. In exemplary applications, the surveillance cameras 5 are aimed at roads, public spaces, company buildings etc. and produce image data streams, the image data streams being stored in the storage media 3. The distribution of the data streams to the different storage media 3 is organized by a storage management device 6. Each of the data producers 2 may comprise precisely one data member, for example one surveillance camera 5, or—as shown at the bottom right of FIG. 1 for example—a plurality of data members, for example a plurality of surveillance cameras 5.

A static system which is therefore easy to control is implemented in the storage system 1. In this case, static means that not every data producer 2 or every surveillance camera 5 can record onto every storage medium 3, but rather the selection is restricted to two storage media 3 per data producer 2, for example, depending on the required failure safety of the storage system 1. As a result of the static allocation, system-related limitations for the worst-case scenario can be checked and can therefore be guaranteed for the runtime of the storage system 1.

In order to make the storage system 1 reliable with respect to failures of A storage media 3, at least A+1 storage media 3 must be available to each data producer 2 for recording. The worst-case scenario then results if all data producers (N in number) assigned to a common storage medium X simultaneously record onto this storage medium. Expressed another way, each data producer 2, in particular each surveillance camera 5, can record onto any desired one of its (A+1) storage media 3 and must therefore reserve a session and corresponding bandwidth for each of these storage media 3. This results in the storage system 1 having to provide a total of at least (A+1)×N sessions and (A+1) times the total streaming bandwidth. Therefore, for reasons of cost, it is advisable to select A to be as small as possible.

The situation in which A=1 is selected is therefore considered below. However, all considerations can be generalized for the situation A>1.

If N data producers are intended to be distributed to M storage media, with the result that each data producer 2 receives two storage media 3, there is a maximum of two of M different groups of storage media 3, in which case, in a particularly ingenious design, each data producer 2 uses the storage media 3 in precisely one of these groups. In the simplest case, there is precisely one data producer 2 per group, all data producers 2 write using the same bandwidth and all storage media 3 have the same properties.

Even under these idealized conditions, the bandwidth of the data producers 2 produced will fluctuate and will not be able to be exactly predicted. A maximum deviation from the ideal bandwidth which can be automatically compensated for by the system without reconfiguration is derived below, with the result that the average load on all storage media remains constant and the lifetimes of the data for all data producers 2 or data members, in particular surveillance cameras 5, therefore strive for the same value.

Figure 2:
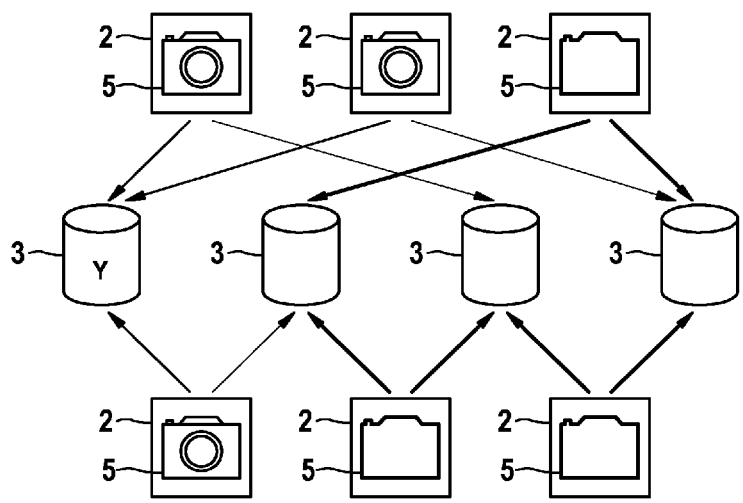

In the worst-case scenario, there is a set of data producers 2 with black surveillance cameras 5 in FIG. 2 which produce a higher data rate than the other cameras by a factor of x (or equivalently the complement set produces a lower data rate by a factor of x). In the worst-case scenario, this set must comprise all data producers 2 which cannot use precisely one storage medium Y. The other data producers 2 are then forced to compensate for the overload by writing their complete data to the storage medium Y (that is to say the dashed arrows in FIG. 2 are not used in this situation). In the scenario under consideration, (M−1) data producers 2 thus write to the storage medium Y at a rate R, while M−2 data producers 2 write to each other storage medium at a rate of x*R/2 (each data producer 2 in principle distributes its load uniformly to both storage media 3).

The storage system 1 thus reaches saturation if (M−1)*R= (M−2)*x*R/2 or, in simplified form, x=2*(M−1)/(M−2). That is to say, a possible deviation of x=2*3/2=3 is obtained for the sketched example. A greater deviation would result in the writing load no longer being able to be uniformly distributed to the storage media 3 and therefore in the storage system 1 no longer being able to completely use the total memory of all storage media 3, that is to say the lifetime of the data must inevitably diverge for different data producers 2 when using the total memory.

Although this worst-case value falls to 2 in the limiting case for larger storage systems 1 having more storage media 3, its occurrence also becomes more and more unlikely at the same time. This simple and static allocation of data producers 2 to storage media 3 therefore remains stable in a guaranteed manner as long as no two data producers 2 have a bandwidth deviation or transmission rate deviation of more than a factor of 2. This statement can be generalized to the effect that two data producers 2 of surveillance cameras 5 (two surveillance cameras 5 belong to the same data producer 2 if they have been allocated to the same storage media 3) may have a total maximum bandwidth deviation of 2.

A requirement imposed on the storage system 1 is failure safety with respect to storage media 3, as is discussed below with reference to FIG. 3. This is a reason why a plurality of storage media 3 are allocated to each data producer 2. If one storage medium 3 (crossed out) now fails, the maximum permitted bandwidth fluctuation with which the storage system 1 still runs in a stable manner in the worst-case scenario also changes. The calculation is carried out in a manner similar to FIG. 2.

M−1 data producers 2 still record onto the storage medium Y in order to compensate for the overload on the other storage media 3. One less storage medium 3 is now available for the remaining data producers 2, with the result that the load on the remaining storage media accordingly increases. Saturation therefore results if (M−1)*R=(1+(M−3)/2)*R*x or, after simplification, x=2. That is to say, a storage system 1 with simple failure safety (A=1) should be set up in such a manner that no data producer 2 produces more than twice the bandwidth of any other data producer averaged over a relatively long period of time (long means shorter than 10% of the possible maximum recording duration, for example). It is thus guaranteed that, even if a storage medium 3 fails, the storage system 1 can continue to operate in a stable manner and the remaining storage capacity is optimally divided between the data producers 2. (On account of the failure, the total storage capacity has fallen and therefore the maximum recording duration.)

So far, identical storage media 3 have been taken into account, that is to say, in particular, storage media which provide the same storage space or storage capacity. This results in the storage system 1 being able to compensate for bandwidth fluctuations up to a factor of 2, even if a storage medium 3 fails.

Figure 4:
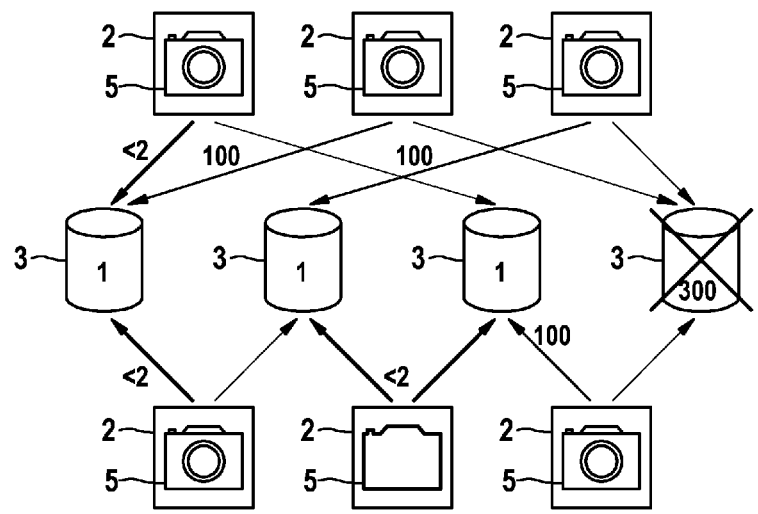

This result can be applied, only to a limited extent, to inhomogeneous storage systems 1 in which the storage media 3 are of different sizes, as explained using FIG. 4. In this respect, the following extreme case is considered in which a storage medium 3 is very much larger than all other storage media, for example by a factor of 300. This storage medium 3 now fails and one of the remaining storage media must also compensate for the overload on the other storage media 3. For reasons of symmetry, the 300 storage units of the storage medium 3 which has failed must be uniformly distributed to the other storage media 3. However, the main load has thus already been fixedly allocated to the remaining three storage media 3 (each storage medium 3 then has a fixed load of 100 in the example) and the remaining small groups may compensate for possible fluctuations of less than 5%. This consideration shows that no bandwidth compensation is possible in inhomogeneous systems in the extreme case. From this consideration, the storage system 1 is provided with homogenous storage media 3, that is to say storage media 3 of approximately the same size.

Figure 5:
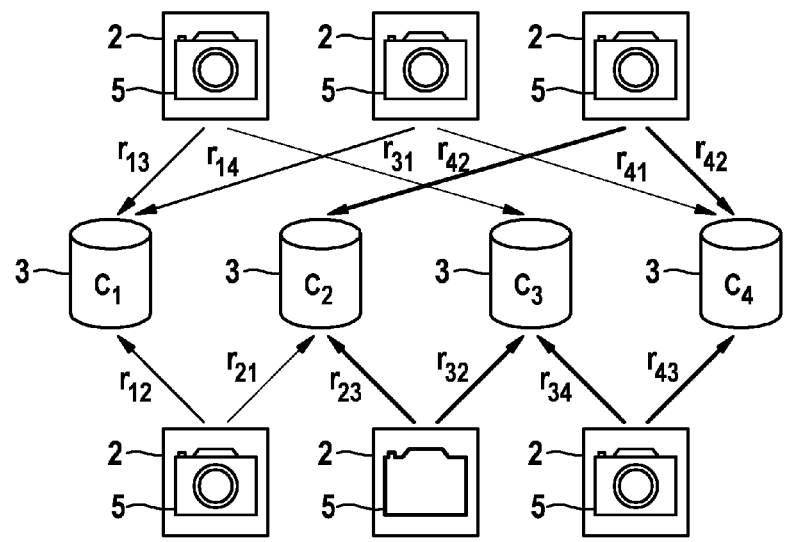

With reference to FIG. 5, the fact that the compensatable bandwidth fluctuation is maximized for the case in which no storage medium 3 fails is concentrated on. First of all, the storage capacities of the storage media 3 are denoted $C\_i$, as shown in FIG. 5. The bandwidths of a data producer which records onto storage medium i and j are denoted $r\_{ij}$ and $r\_{ji}$. In this case, $r\_{ij}$ corresponds to the bandwidth for the storage medium i and $r\_{ji}$ corresponds to the bandwidth for the storage medium j. The total bandwidth of all data producers 2 together is R, the total storage capacity is C and the recording duration is T. This immediately results in the following conditions:

The recording duration T corresponds to the ratio of the total storage capacity and the total bandwidth:

$$T=C/R. \qquad [0]$$

The sum of all incoming edges of a storage medium 3 must completely describe the storage medium 3 within a period T (assuming that the storage system 1 is in the normal state), that is to say $$C\_i = T*\text{sum}\_\{j!=i\} r\_ij. \quad [1]$$

The following applies to the total storage capacity C:

$$C = \text{sum}\_i C\_i. \quad [2]$$

If the bandwidths $r\_ij = R*C\_i*C\_j/((C-C\_i)*C)$ are selected, guaranteed bandwidth compensation of a factor of 2 is obtained.

This distribution satisfies condition [1]:

$$T^* \text{sum}\_\{j != i\} r\_ij \quad [1']$$
$$= T^* R^* C\_i/((C - C\_i)^*C)^* \text{sum}\{j != i\} C\_i$$
$$= (C/R)^* R^* C\_i/((C - C\_i)^*C)^* (C - C\_i)$$
$$= C\_i.$$

In order to verify the factor of 2, the bandwidths of all data producers 2 which cannot record onto C_1 are increased by a factor of 2, like in the homogeneous case, while the other data producers 2 pass their full load to C_1 for the purpose of compensation. In this case, the load conditions on the individual storage media 3 must remain unchanged. Written in formulas, the following inequality is obtained for the ratio of storage medium C_1 to storage medium C_2:

$$T^*(\text{sum}\_\{i!=1\} r\_1i + r\_i1)/C\_1 >= x^*T^*(-r\_21 + \text{sum}\{i!=2\} r\_2i)/C\_2. \quad [3]$$

The following is obtained using [0], [1] and [2]:

$$1 + (\text{sum}\_\{i!=1\} C\_i/(C-C\_i)) >= x^*(1-C\_1/(C-C\_2)). \quad [4]$$

The following inequality chain now applies:

$$1 + (\text{sum}\_\{i!=1\} C\_i/(C-C\_i)) >= 1 + (\text{sum}\_\{i!=1\} C\_i/C) >= 2 - C\_1/C >= 2^*(1 - C\_1/(C-C\_2)). \quad [5]$$

That is to say, the proposed distribution copes with bandwidth fluctuations of at least a factor of 2 in the inhomogeneous case if no storage medium 3 has failed, and is therefore asymptotically optimal.

In the previous section, an asymptotically optimal total bandwidth per data producer was derived for each data producer $G\_ij$. This is $r\_ij + r\_ji = C\_i * C\_j * (1/(C-C\_i) + 1/(C-C\_j))/T$. This bandwidth can also be called the system transmission rate.

The task of the storage management device is to distribute the data members, in particular the surveillance cameras 5, to the data producers 2 in such a manner that these ideal total bandwidths per data producer 2 are achieved.

The distribution can be achieved, for example, by means of the following algorithm:

```
const int N = ...;            //number of storage media (3)
const int M = ...;            //number of cameras (data members)
const int G = N*(N-1)/2;      //number of groups/data producers (2)
//List with the sizes of the storage media
vector<float>memory sizes(N, 0);
//List with the bandwidth values of the cameras
vector<float>camera bandwidths(M);
//List with the remaining bandwidth contingents of each group
vector<float>group remaining sizes(G,0);
//Groups sorted according to size
set<pair<float, int>>sorted remaining sizes;
//Assignment of the cameras to groups
vector<int>camera groups(M,-1);
//Assignment of the groups to memory
vector<pair<int, int>>group memory(G);
void main( ) {
    Initialization( );
    Greedy assignment( );
    for(;local optimization( ););//Swap two cameras until an improvement is no longer possible
//Output
    for(int camera = 0; camera < M; camera++) {
        int group = camera groups [camera];
        cout<<"camera"<<camera<<"records to memory"
            <<group memory[group].first<<"and"
            <<group memory[group].second<<endl;
    }
}
void initialization( ) {
//Fill memory sizes according to the size of the storage media
...
//Fill camera bandwidths according to the expected bandwidths of the cameras
...
//Calculate total memory and total bandwidth
float total memory = 0;
for(int memory = 0; memory < N; memory++)
    total memory += memory sizes[memory];
float total bandwidth = 0;
for(int camera = 0; camera < M; camera++)
    total bandwidth += camera bandwidths[camera];
float T = total memory/total bandwidth;
//Derive the group sizes to be achieved from the memory sizes and camera bandwidths
int group = 0;
for(int memory1 = 0; memory1 < N; memory1++) {
    for(int memory2 = memory1+1; memory2 < N; memory2++) {
        group remaining sizes[group] =
            memory sizes[memory1]*memory sizes[memory2]
            *(1/(total memory - memory sizes[memory1])
            +1/(total memory - memory sizes[memory2]))/T;
        group memory[group].first = memory1;
        group memory[group].second = memory2;
        group++;
    }
}
//Fill auxiliary structure
for(int i = 0; i < G; i++)
    Sorted remaining sizes.insert(make_pair(group remaining sizes[i], i));
}
void greedy assignment( ) {
//Build a sorted list of the camera bandwidths
vector<pair<float, int>>sorted bandwidths(G);
for(int camera = 0; camera < M; camera++) {
    sorted bandwidths[camera].first = camera bandwidths[camera];
    sorted bandwidths[camera].second = camera;
}
sort(sorted bandwidths.begin( ), sorted bandwidths.end( ));
while(sorted bandwidths.size( )) {
    //note the camera with the widest bandwidth and remove it
    from the sorted list
        int camera = sorted bandwidths.back( ).second;
        sorted bandwidths.pop_back( );
    //add the camera to the group still having the most contingent left
        int group = (--sorted remaining sizes.end( ))->second;
        sorted remaining sizes.erase(--sorted remaining sizes.end( ));
        camera groups[camera] = group;
        group remaining size[group] -= camera bandwidths[camera];
        sorted bandwidths.insert(make_pair(group remaining size
        [group], group));
    }
}
void change camera assignment(int camera, int group) {
int old group = camera groups[camera];
if (old group == group)//same group => nothing to do
    return;
//remove affected groups from the sorted set
sorted remaining sizes.erase(make_pair(group remaining size[old group], old group));
sorted remaining sizes.erase(make_pair(group remaining size[group], group));
```

-continued

```
//change the groups and assign the camera to the new group
group remaining size[old group] += camera bandwidths[camera];
camera groups[camera] = group;
group remaining size[group] -= camera bandwidths[camera];
//insert the changed groups into the sorted set again
sorted remaining sizes.insert(make_pair(group remaining size[camera],
camera));
sorted remaining sizes.insert(make_pair(group remaining size[old group],
old group));
}
bool local optimization( ) {
        bool changes = false;
        for(int camera1 = 0; camera1 < M; camera1++) {
            for(int camera2 = 0; camera2 < M; camera2++) {
                int group1 = camera groups[camera1];
                int group2 = camera groups[camera2];
                //search for cameras which are in different groups
                if (group1 == group2) continue;
                //Does the square distance become smaller with respect to
the group target size,
                //if the two cameras are swapped?
                int remaining size1 = group remaining size[group 1] + camera
bandwidths[camera1] - camera bandwidths[camera2];
                int remaining size2 = group remaining size[group2] + camera
bandwidths[camera2] - camera bandwidths[camera1];
                //square(x) calculates the square of x: x*x
                if (square(remaining size1) + square(remaining size2) >=
                    square(group remaining size [group 1]) + square(group
remaining size[group2]))
                    continue;
                change camera assignment(camera1, group2);
                change camera assignment(camera2, group1);
                changes = true;
            }
        }
}
return changes;
```

Figure 6:
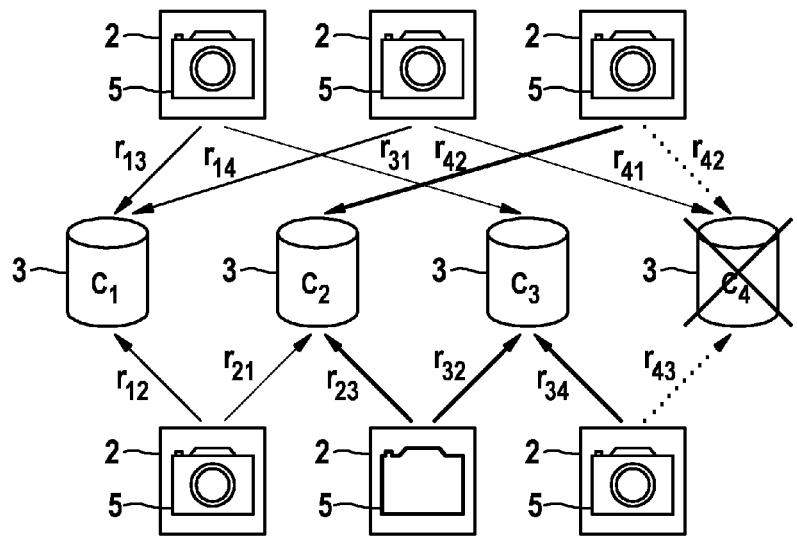

With the derived transmission rate r_ij, optimal utilization of the inhomogeneous storage media 3 can be guaranteed in the event of a bandwidth fluctuation of 2. FIG. 6 shows the failure of storage medium C4 and the simultaneous bandwidth increase of all data producers 2 which do not record onto storage medium C1. The following inequality then results for the load ratio of storage medium C1 to storage medium C2:

$$T*(\text{sum}\_\{i!=1\}r\_1i+r\_i1)/C\_1 >= x*T*(r\_42-r\_21+\text{sum}\_\{i!=2\}r\_2i)/C\_2. \quad [6]$$

The following is obtained using [0], [1] and [2]:

$$1+\text{sum}\{i!=1\}C\_i/(C-C\_i) >= x*(1-C\_1/(C-C\_2)+C\_4/(C-C\_4)). \quad [7]$$

The left-hand term can be estimated with a lower limit of $2-C\_1/C$. The load ratio x assumes its worst value when $C\_2$ and $C\_4$ correspond to the largest storage medium (denoted C_max below) and $C\_1$ corresponds to the smallest storage medium (denoted C_min below). The following then results as the guaranteed lower limit for the load ratio:

$$x >= (2-C\_\text{min}/C)*(C-C\_\text{max})/(C-C\_\text{min}). \quad [8]$$

With inequality [8], guaranteed load balancing can be calculated for each inhomogeneous storage system 1 for the case in which a storage medium 3 fails, and the quality of the selection of the storage media 3 can therefore be determined.

The considerations above have predominantly dealt with the input load on the storage media. The problem of optimal memory release therefore remains. For this purpose, the current recording duration for each data producer 2 is defined as that period of time for which all video data are present without loss from now into the past (if data are present on a failed storage medium, said data are not considered to be lost).

Criterion [Z]: the aim of the storage management device 6 is to maximize the shortest recording duration across all cameras.

In this respect, extreme examples which should be avoided and from which simple solution approaches do not recover are again considered first of all.

Figure 7:
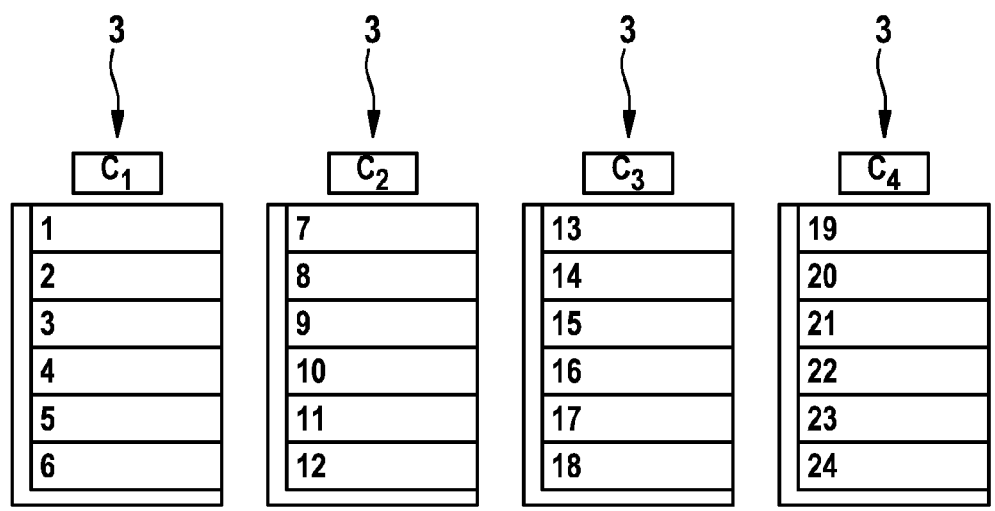
FIG. 7 shows a schematization of storage distribution.

FIG. 7 shows three storage media 3 with the same capacity. All three storage media 3 were empty at the start and were sequentially filled (for example because one storage medium 3 after the other was included in the storage system 1). The rectangles of a storage medium 3 which are provided with numbers correspond to the order in which the storage blocks were written to. That is to say, in order to optimize the criterion [Z], the storage block with the smallest number would always be written to next.

Figure 3:
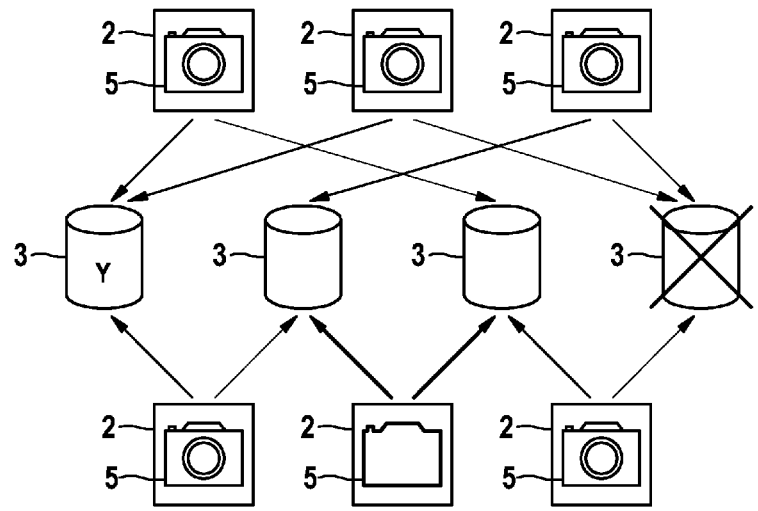

System limitations are now added, with the result that there is a compulsion to use a distribution as proposed in FIG. 3. If the storage medium C1 now fails, the data producers 2 which can choose only between C1 and C4 must inevitably record onto C4. This results in the youngest blocks being overwritten first and therefore in the actual recording duration tending toward 0 according to the above objective.

Although it is unlikely that this extreme case will be found in pure form in practice, a general memory allocation principle can nevertheless be derived therefrom. Specifically, temporal storage clusters must be avoided when allocating memory since otherwise the recording duration can dramatically fall in the event of memory failures or other changes to the storage system 1. Conversely, the storage management device 6 must ensure that storage blocks of a similar age are distributed as uniformly as possible over the different storage media 3.

In order to achieve this aim, it is obvious to take into account the current age structure during allocation. However, this procedure has the great disadvantage that any irregularity in the age structure can inevitably be found again (possibly in weakened form) after complete overwriting of the memory (also called the period below). The simplest way of considering the current age structure is to consider the oldest block of each storage medium. Memory of the storage medium 3 with the oldest block is now allocated to a data producer 2. In this case, only storage media 3 onto which the data producer 2 can also record are taken into account. This procedure substantially repeats the already existing age structure and is therefore unsuitable. Randomized approaches can be used to improve the situation somewhat. In this case, chance has the task of taking the current age structure into account to a lesser extent during selection and therefore of reducing the repetition of the storage clusters in the next period.

As an exemplary embodiment, an algorithm is now proposed which completely ignores the current age structure and has therefore completely recovered from disruptions after one period at the latest. The algorithm operates as follows. A counter is introduced for each storage medium 3, which counter is increased, each time memory from this storage medium 3 is allocated to a data producer 2, by the corresponding percentage of the allocated memory with respect to the total memory of this storage medium 3. If a data producer 2 requests memory from the storage management device 6, the storage management device 6 compares the counter readings of the potential storage media 3 and allocates memory from the storage medium 3 with the lowest counter reading to the data producer 2. The storage management device 6 therefore keeps the counter readings at an even level as far as possible.

If the counter readings drift apart, the data producers 2 have been distributed to the storage media 3 in such a manner that it is impossible to uniformly fill the storage media 3. If the counter readings have drifted far apart, the algorithm, after correcting the allocation of the data producers 2 or data members to data producers 2 and to storage media 3, will start to give preference to the storage medium 3 with the lowest counter reading and will therefore cause clustering. Therefore, after correction, the counter readings must either be set to 0 again or the minimum counter reading must be artificially increased if the deviation from the maximum counter reading becomes too large. The same situation is produced if a new storage medium 3 is included in the storage system. In this case too, the counter reading of the new storage medium 3 must be initialized, for example, to the average of the other counters. The same situation applies if a storage medium 3 has failed and returns to the storage system 1 again.

One possible embodiment for memory allocation is illustrated below:

```
//Counter for storage medium i
float memory counter[M];
//Size of the storage medium i
float memory size[M];
//Availability of the storage medium i
bool memory online[M];
//List of the storage media which can be used by camera i
vector<int> camera memory[N];
//initialize all variables
void Init( ) {
   for(int i = 0; i < M; i++) {
      //all counters are set to the same value at the start
      memory counter[i] = 0;
      //Set the memory size
      memory size[i] = ...;
      memory online[i] = true;
   }
   //Insert the permitted storage media j for each camera i into
   //the list of camera memories.
   ...
}
//If a camera needs new memory, the get memory function is called
//in order to obtain the index of the storage medium onto which the
camera j is next
//intended to record.
//Return value is −1 if none of the allocated storage media is online.
int get memory(int camera ID) {
   int memory ID = −1
   for (int k = 0; k < camera memory[camera ID].size( ); k++) {
      int memory ID2 = camera memory[camera ID][k];
      if (memory online[memory ID2]) {
         //which memory was recorded to less?
         if (memory ID == −1 or
         memory counter[memory ID2] < memory counter[memory ID])
            memory ID = memory ID2;
      }
   }
   if (memory ID >= 0) {
      //increase the counter of the selected memory by a unit
      //standardized to the total memory size.
      memory counter[memory ID] += 1/memory size[memory ID];
   }
   return memory ID;
}
//If a storage medium fails, the memory failed function is called.
void memory failed (int memory ID) {
   memory online[i] = false;
}
//If a failed storage medium is available again, the
//memory available function is called.
void memory available (int memory ID) {
   int online counter = 0;
   float counter sum = 0;
   for (int i = 0; i < M; i++) {
      if (memory online[i]) {
         online counter += 1;
         counter sum += memory counter[i];
      }
   }
```

-continued

```
   Memory online[memory ID] = true;
   //Set the counter to the mean value of the counters of the available
   memories
   if (online counter)
      memory counter[memory ID] = counter sum/online counter;
   //If there are no other online memories, the counter also need not
   //be synchronized with other counters.
}
```

The invention claimed is:

1. A storage system comprising:
a number of M storage media,
a number of N data producers each providing a data stream and each having one or more data members, and
a storage management device configured to
statically assign an exclusive group (A+1) of the M storage media to each of the N data producers, wherein the exclusive group statically assigned to each of the N data producers is greater than or equal to 1 and less than all of the M storage media, and wherein the exclusive group statically assigned to each of the N data producers do not completely overlap with each other, and
distribute the data streams from each of the N data producers to only the statically assigned exclusive group of the M storage media.

2. The storage system as claimed in claim 1, wherein the storage system is a surveillance system.

3. The storage system as claimed in claim 1, wherein the number N of data producers is selected to be greater than 6, and A is simultaneously selected to be less than or equal to 6.

4. The storage system as claimed in claim 1, wherein each of the N data producers has a data stream at a data transmission rate, the data members of the N data producers being selected in such a manner that the data transmission rates of the data streams are approximately equal or equal to one another or to a common system transmission rate.

5. The storage system as claimed in claim 1, wherein each of the N data producers has a data stream at a data transmission rate, the data members of the N data producers being selected in such a manner that the data transmission rates of the data streams are less than twice and simultaneously greater than 0.5 times a common system transmission rate.

6. The storage system as claimed in claim 1, wherein the M storage media have a similar storage capacity, with the result that the deviation from an averaged storage capacity over all the M storage media is about 20% or less.

7. The storage system as claimed in claim 1, wherein each storage medium of the M storage media has a counter which is designed to change the counter reading on the basis of the quotient between the allocated memory and available memory, and the storage management device is designed to distribute the data stream from one of the N data producers to the statically assigned storage medium of the exclusive group with the lowest counter reading.

8. The storage system as claimed in claim 7, wherein the counter readings of the exclusive group of the M storage media statically assigned to the one of the N data producers is set to a value selected from the group including 0, a uniform value, and an averaged value in the event of a manual correction or in the event of inclusion of a new storage medium.

9. A method for operating a storage system, the storage system having a multiplicity of data members, N data producers and M storage media, the method comprising:

distributing the data members to the N data producers;

statically assigning an exclusive group (A+1) of the M storage media to each of the N data producers, wherein the exclusive group statically assigned to each of the N data producers is greater than or equal to 1 and less than all of the M storage media, and wherein the exclusive group statically assigned to each of the N data producers do not completely overlap with each other; and distributing data streams from each of the N data producers to only the statically assigned exclusive group of the M storage media.

10. The method as claimed in claim 9, wherein the data members are distributed to the N data producers in such a manner that the data transmission rates of the N data producers are approximately equal or equal to one another.

11. The method as claimed in claim 9, wherein each of the M storage media has a counter, the counter reading of which is increased on the basis of a quotient of retrieved memory to available memory, and a storage management device allocates the storage medium of the M storage media having the lowest counter reading to one of the N data producers.

12. A computer program stored on a non-transitory computer readable medium and having program code that, when executed on a computer is configured to:

distribute one or more data members to a multiplicity of N data producers, statically assign an exclusive group of M storage media to each of the N data producers, wherein the exclusive group statistically assigned to each of the N data producers is greater than or equal to 1 and less than all of the M storage media, and wherein the exclusive group statically assigned to each of the N data producers do not completely overlap with each other, and distribute data streams from each of the N data producers to only the statically assigned exclusive group of the M storage media.

13. The storage system as claimed in claim 2, wherein at least one of the data members includes a surveillance camera.

* * * * *